US 9,897,215 B2

(12) United States Patent
Hunter et al.

(10) Patent No.: US 9,897,215 B2
(45) Date of Patent: Feb. 20, 2018

(54) MULTI-VALVE SEAT SEAL ASSEMBLY FOR A GATE VALVE

(71) Applicant: Vetco Gray Inc., Houston, TX (US)

(72) Inventors: Rick C. Hunter, Friendswood, TX (US); Jon B. Kahn, Spring, TX (US); Fabio Okamoto Tanaka, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 504 days.

(21) Appl. No.: 14/143,841

(22) Filed: Dec. 30, 2013

(65) Prior Publication Data
US 2014/0183396 A1    Jul. 3, 2014

Related U.S. Application Data

(60) Provisional application No. 61/747,749, filed on Dec. 31, 2012.

(51) Int. Cl.
F16K 3/02       (2006.01)
F16K 3/30       (2006.01)
(Continued)

(52) U.S. Cl.
CPC ............ F16K 3/30 (2013.01); F16K 3/0227 (2013.01); F16K 3/0236 (2013.01); F16K 41/08 (2013.01);
(Continued)

(58) Field of Classification Search
CPC .... F16K 3/0227; F16K 3/0236; F16K 3/0245; F16K 3/0281; F16K 41/003; F16K 41/02; F16K 41/04; F16K 41/06; F16K 41/08; F16K 1/46; F16K 1/465; F16K 5/0285; F16K 5/0694
(Continued)

(56) References Cited

U.S. PATENT DOCUMENTS 765,430 A * 7/1904 Huxley ................. F16K 3/0227
                                              251/328
3,060,964 A   10/1962 Bagwell
(Continued)

FOREIGN PATENT DOCUMENTS

CN    102094987    6/2011
EP    0308390      6/1992
(Continued)

OTHER PUBLICATIONS

PCT Search Report and Written Opinion dated Apr. 22, 2014 in connection with related PCT Patent Application No. PCT/US2013/078434.
(Continued)

Primary Examiner — Mary McManmon
Assistant Examiner — Hailey K Do
(74) Attorney, Agent, or Firm — Hogan Lovells US LLP

(57) ABSTRACT

A gate valve for use in oil field applications and including a seat seal assembly. The seat seal assembly includes primary, secondary, and tertiary seals for sealing the space between the seat rings and the valve body. The provision of multiple seals in the seat seal assembly provides redundancy that allows for maintenance of the seal between the components even if one or two of the individual seals fail.

13 Claims, 10 Drawing Sheets

(51) Int. Cl.
*F16K 41/08* (2006.01)
*E21B 33/00* (2006.01)

(52) U.S. Cl.
CPC ....... *E21B 2033/005* (2013.01); *F16K 3/0245* (2013.01); *F16K 3/0281* (2013.01)

(58) Field of Classification Search
USPC ....... 251/326, 328, 330, 360, 363, 170–172, 251/174–176, 193, 214; 277/530, 567, 277/584, 308, 510, 512, 515, 517
See application file for complete search history.

(56) References Cited

U.S. PATENT DOCUMENTS

| | | | |
|---|---|---|---|
| 3,421,547 A | | 1/1969 | Aslan |
| 3,765,690 A | | 10/1973 | Sievenpiper |
| 3,921,991 A | | 11/1975 | Beck |
| 3,958,592 A | | 5/1976 | Wells |
| 3,990,679 A | | 11/1976 | Boitnott |
| 4,112,969 A | * | 9/1978 | Still ................. F16K 3/0263 137/454.2 |
| 4,230,299 A | | 10/1980 | Pierce, Jr. |
| 4,274,432 A | | 6/1981 | Tunstall |
| 4,281,819 A | | 8/1981 | Linder |
| 4,340,204 A | | 7/1982 | Herd |
| 4,363,465 A | | 12/1982 | Morrill |
| 4,364,544 A | * | 12/1982 | Kim ................. F16K 3/0227 251/170 |
| 4,451,047 A | | 5/1984 | Herd |
| 4,531,711 A | | 7/1985 | Bunch |
| 4,541,449 A | * | 9/1985 | Burke ................. F16K 3/0236 137/72 |
| 4,568,062 A | * | 2/1986 | Regitz ................. F16K 3/0236 137/72 |
| 4,570,659 A | | 2/1986 | Karr, Jr. |
| 4,576,385 A | | 3/1986 | Ungchusri et al. |
| 4,577,873 A | | 3/1986 | Baumann |
| 4,592,558 A | | 6/1986 | Hopkins |
| 4,658,847 A | | 4/1987 | McCrone |
| 4,706,970 A | | 11/1987 | Ramirez |
| 4,878,651 A | * | 11/1989 | Meyer, Jr. ................. F16K 3/207 251/172 |
| 4,886,241 A | | 12/1989 | Davis |
| 4,893,650 A | | 1/1990 | Chisholm |
| 5,031,923 A | | 7/1991 | Davies |
| 5,078,175 A | | 1/1992 | Martin et al. |
| 5,094,270 A | | 3/1992 | Reimert |
| 5,192,051 A | | 3/1993 | Roberson |
| 5,201,872 A | | 4/1993 | Dyer |
| 5,230,498 A | | 7/1993 | Wood |
| 5,238,252 A | | 8/1993 | Stewen |
| 5,246,236 A | | 9/1993 | Szarka |
| 5,306,021 A | | 4/1994 | Morvant |
| 5,375,812 A | | 12/1994 | Kent |
| 5,612,537 A | | 3/1997 | Maynard et al. |
| 5,624,101 A | | 4/1997 | Beson |
| 5,730,419 A | | 3/1998 | Williams et al. |
| 6,082,707 A | | 7/2000 | Hosie |
| 6,260,822 B1 | * | 7/2001 | Puranik ................. F16K 3/0236 251/328 |
| 6,290,235 B1 | | 9/2001 | Albertson |
| 6,626,239 B2 | * | 9/2003 | Cunningham ...... E21B 33/0355 166/348 |
| 6,726,220 B2 | | 4/2004 | Grimanis et al. |
| 6,840,270 B2 | | 1/2005 | Yu |
| 6,869,079 B2 | | 3/2005 | Zheng |
| 6,910,494 B2 | | 6/2005 | Warsakis |
| 6,966,537 B2 | * | 11/2005 | Sundararajan .......... F16K 3/207 251/172 |
| 7,004,452 B2 | * | 2/2006 | Chatufale .............. F16K 3/0227 251/171 |
| 7,111,821 B2 | | 9/2006 | Promper |
| 7,309,058 B2 | | 12/2007 | Hunter |
| 7,428,912 B2 | | 9/2008 | Pozzati |
| 7,565,913 B2 | | 7/2009 | Pozzati |
| 7,946,556 B1 | | 5/2011 | Trott |
| 8,752,634 B2 | | 6/2014 | Tanaka et al. |
| 9,010,725 B2 | | 4/2015 | Hunter |
| 2003/0116732 A1 | | 6/2003 | Chatufale |
| 2003/0155717 A1 | | 8/2003 | Zheng |
| 2007/0052181 A1 | | 3/2007 | Nakamura |
| 2007/0085279 A1 | | 4/2007 | Burdick |
| 2010/0052267 A1 | | 3/2010 | Castleman et al. |
| 2010/0243936 A1 | * | 9/2010 | Nesje .................. F16K 3/0227 251/282 |
| 2012/0080634 A1 | * | 4/2012 | Fenton ................. F16K 3/0236 251/328 |
| 2012/0085957 A1 | * | 4/2012 | Dhawan ............... F16K 3/0209 251/326 |
| 2014/0183392 A1 | | 7/2014 | Hunter |
| 2014/0183393 A1 | | 7/2014 | Hunter |
| 2015/0226338 A1 | | 8/2015 | Hunter |

FOREIGN PATENT DOCUMENTS

| | | | |
|---|---|---|---|
| EP | 0525261 A1 | 2/1993 | |
| EP | 1925865 | 5/2008 | |
| FR | 1590414 A * | 4/1970 | ........... F16K 3/0227 |
| GB | 2103310 A | 2/1983 | |
| GB | 2284650 | 6/1995 | |
| WO | 2012121745 | 9/2012 | |
| WO | 2012154056 | 11/2012 | |

OTHER PUBLICATIONS

U.S. Appl. No. 14/143,615, filed Dec. 30, 2013, Rick C. Hunter.
U.S. Appl. No. 14/144,102, filed Dec. 30, 2013, Rick C. Hunter.
Chinese Office Action dated Dec. 4, 2015 issued in connection with corresponding CN Application No. 201210559415.3.
PCT Search Report and Written Opinion dated Jul. 12, 2016 issued in connection with corresponding PCT Application No. PCT/US2016/025107.

* cited by examiner

MULTI-VALVE SEAT SEAL ASSEMBLY FOR A GATE VALVE

CROSS REFERENCE TO RELATED APPLICATIONS

This application claims priority to and the benefit of U.S. Provisional Application Ser. No. 61/747,749, which was filed Dec. 31, 2012, the full disclosure of which is incorporated herein by reference.

BACKGROUND OF THE INVENTION

1. Field of the Invention

This technology relates to oil and gas wells, and in particular to seals in gate valves used in oil and gas field applications.

2. Brief Description of Related Art

Typical gate valves used in connection with oil and gas operations have a valve body with a flow passageway that extends therethrough. The flow passageway intersects a central cavity, where a gate is located. The gate has an opening, and moves between open and closed positions. When in the open position, the opening is aligned with the fluid path so that fluid can flow therethrough. Conversely, when the gate is in the closed position, the gate blocks the flow passageway. The gate is attached to a stem, which controls the position of the gate between the open and closed positions. Typically, seat rings are placed in counterbores formed in the valve body at the intersection of the flow passageway and the cavity.

A typical gate valve may further include a bonnet that is attached to the valve body. The bonnet surrounds the stem, which passes from the central cavity through a stem opening in the bonnet. This stem opening is generally in communication with the central cavity. Accordingly, the space between the stem and the bonnet must be sealed to avoid leakage.

In addition, the seat rings generally have seat seals that seal the seat rings to the valve body. Such seat seals prevent the entry of fluid from the central cavity to the downstream flow passageway. When the gate is open, the seat seals help to keep the seats centralized in their pockets, and minimize the ingress of sand and debris into the central cavity. When the gate is closed, fluid will flow past the upstream seat ring and into the central cavity. The seat seals of the downstream seat ring prevent this fluid from passing between the downstream seat ring and the valve body into the downstream flow passageway. By positioning seat rings on either side of the gate, the gate valve can be used for bi-directional fluid flow, because no matter which way the fluid flows, there is always a seat ring having seat seals on the downstream side of the gate.

Elastomeric stem and seat seals have been used in the industry. However, since elastomeric seals do not have the necessary longevity, especially in corrosive environments, or the ability to withstand high temperatures and pressures, metal seals have become popular. Metal seals, however, have their own problems, including premature wear, damage to the sealing surfaces, and insufficient sealing capacity under certain conditions.

SUMMARY OF THE INVENTION

Disclosed herein is a gate valve for use in oil field applications. The gate valve includes a valve body that has a flow passageway extending therethrough. A gate having an opening is positioned to intersect the flow passageway. In its open position, the opening of the gate aligns with the flow passageway. Conversely, in its closed position, the gate blocks the flow passageway. The gate is controlled by a stem that is attached to the gate, and that moves the gate between the open and closed positions. The gate valve also has a bonnet, and a pair of seat rings. The bonnet is attached to the valve body, and substantially surrounds the stem. The seat rings are positioned between the valve body and the gate, and circumscribe the flow passageway.

The gate valve further includes a multi-valve seat seal assembly between each seat ring and the valve body that includes a primary metal seat seal, a secondary seat seal, and, in some embodiments, a tertiary metal seat seal. The primary metal seat seal has a sealing portion with first and second legs. The first leg may have a sealing surface positioned substantially parallel and adjacent to a surface of the valve body. The first leg may also be dynamic, so that pressure can escape past the leg from behind the primary seat seal toward the flow passageway. In addition, the first leg is also configured to seal against the valve body, and may have a polymeric coating.

The secondary seat seal is positioned between the seat ring and the valve body, and is configured to seal against surfaces of the seat ring and the valve body. An anti-extrusion ring may be positioned adjacent an end of the secondary seat seal distal from the gate. Such an anti-extrusion ring is configured to engage and support a surface of the secondary seat seal to maintain the shape of the secondary seat seal, thereby preventing reforming of the secondary seat seal during exposure to high heat or pressure. In addition, a metal standoff ring may be positioned between the primary metal seat seal and the secondary seat seal to restrain movement of the secondary seat seal axially toward the primary metal seat seal.

The tertiary metal seat seal may have a sealing face configured for sealing engagement with the valve body. One purpose of the tertiary metal seat seal is to provide redundancy to the primary metal and secondary seat seals. The sealing face of the tertiary metal seat seal may be coated with a polymeric coating to improve its ability to seal against the valve body.

The seat seal assembly may also include a sand excluder configured to block sand, or other solid particles, from entering the interface between the seat ring and the valve body. The sand excluder is positioned between the seat ring and the valve body adjacent the flow passageway, and has a spring and an excluding arm. The excluding arm has a valve body engaging portion configured to contact the valve body. In practice, the spring extends between the seat ring at one end, and the valve body engaging portion of the excluding arm at the other end. The spring is biased to urge the valve body engaging portion of the excluding arm into substantially continuous contact with the valve body.

Features of the excluding arm of the sand excluder include a transverse section that is connected to the valve body engaging portion, and that includes a sand excluder notch. The sand excluder notch corresponds to a similar seat ring notch on the seat ring. The sand excluder notch is configured so that when it contacts the seat ring notch, the excluding arm is restrained from further movement outward toward the valve body. The excluding arm of the sand excluder may also have a vent passing therethrough. The vent is positioned to allow fluid to bypass the excluding arm and enter between the seat ring and the valve body.

BRIEF DESCRIPTION OF THE DRAWINGS

The present technology will be better understood on reading the following detailed description of nonlimiting embodiments thereof, and on examining the accompanying drawings, in which.

DETAILED DESCRIPTION OF THE PREFERRED EMBODIMENT

Figure 1:
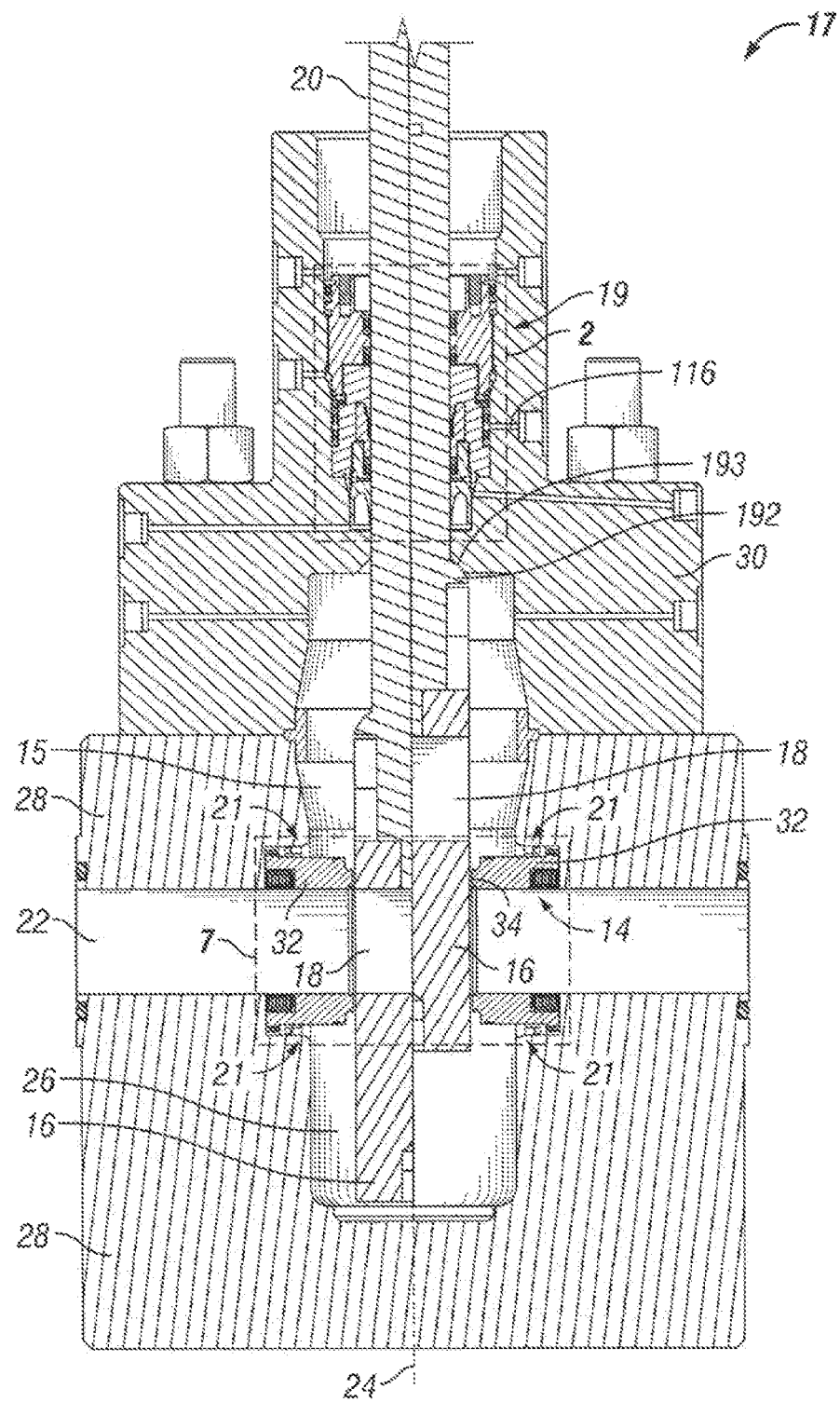
FIG. 1 is side cross-sectional view of a gate valve assembly including a multi-valve stem seal assembly and a multi-valve seat seal assembly according to an embodiment of the present technology.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, the technology is not intended to be limited to the specific terms used, and it is to be understood that each specific term includes equivalents that operate in a similar manner to accomplish a similar purpose.

FIG. 1 shows a side cross-sectional view of a gate valve assembly 17 according to an embodiment of the present technology, including a multi-valve stem seal assembly 19 and a multi-valve seat seal assembly 14. The gate valve assembly 17 includes a gate 16 with an opening 18. The gate 16 is attached to a stem 20, and moves in a central cavity 15 of a valve body 28. The central cavity 15 is perpendicular to and intersects a flow passageway 22 through which fluid can flow.

In practice, the gate 16 can be moved between an open position and a closed position. In FIG. 1, the gate is shown in an open position to the left of centerline 24, and in a closed position to the right of centerline 24. As can be seen, when the gate 16 is in its open position, the opening 18 is aligned with the flow passageway 22 so that fluid in the flow passageway 22 can pass through the opening 18. In its open position, the gate 16 may be received into a recess 26 in the valve body 28. Conversely, when the gate 16 is in its closed position, the gate 16 blocks the flow passageway 22. In the closed position, the opening 18 is moved upward away from the flow passageway 22, and the gate 16 moves into the flow passageway 22, thereby obstructing the flow of fluid through the flow passageway 22.

Movement of the gate 16 between an open and a closed position may be accomplished by any appropriate means. For example, the embodiment of FIG. 1 shows a rising stem 20, which opens and closes the gate 16 by moving the stem 20 upward and downward relative to the flow passageway 22. Alternate embodiments may include non-rising stems that employ other means, such as threads, to raise and lower the gate 16 without raising and lowering the stem 20 itself.

The gate valve assembly 17 further includes a bonnet 30 mounted to the valve body 28, and seat rings 32 located between the valve body 28 and the gate 16. Each junction between the central cavity 15 and the flow passageway 22 has a counterbore 21 with an end face 170. Each seat ring 32 is mounted in one of the counterbores 21, and is free to move a limited amount along the axis of each seat ring 32. The multi-valve stem seal assembly 19 helps provide a seal between the stem 20 and the bonnet 30. The multi-valve seat seal assembly 14 provides a seal between each seat ring 32 and the valve body 28. Each seat ring 32 also has a face 34 positioned adjacent to the gate 16 to guide the gate 16. A detailed description of the multi-valve stem seal assembly 19 and the multi-valve seat seal assembly 14 follows herein below.

Stem Seal Assembly

Figure 2:
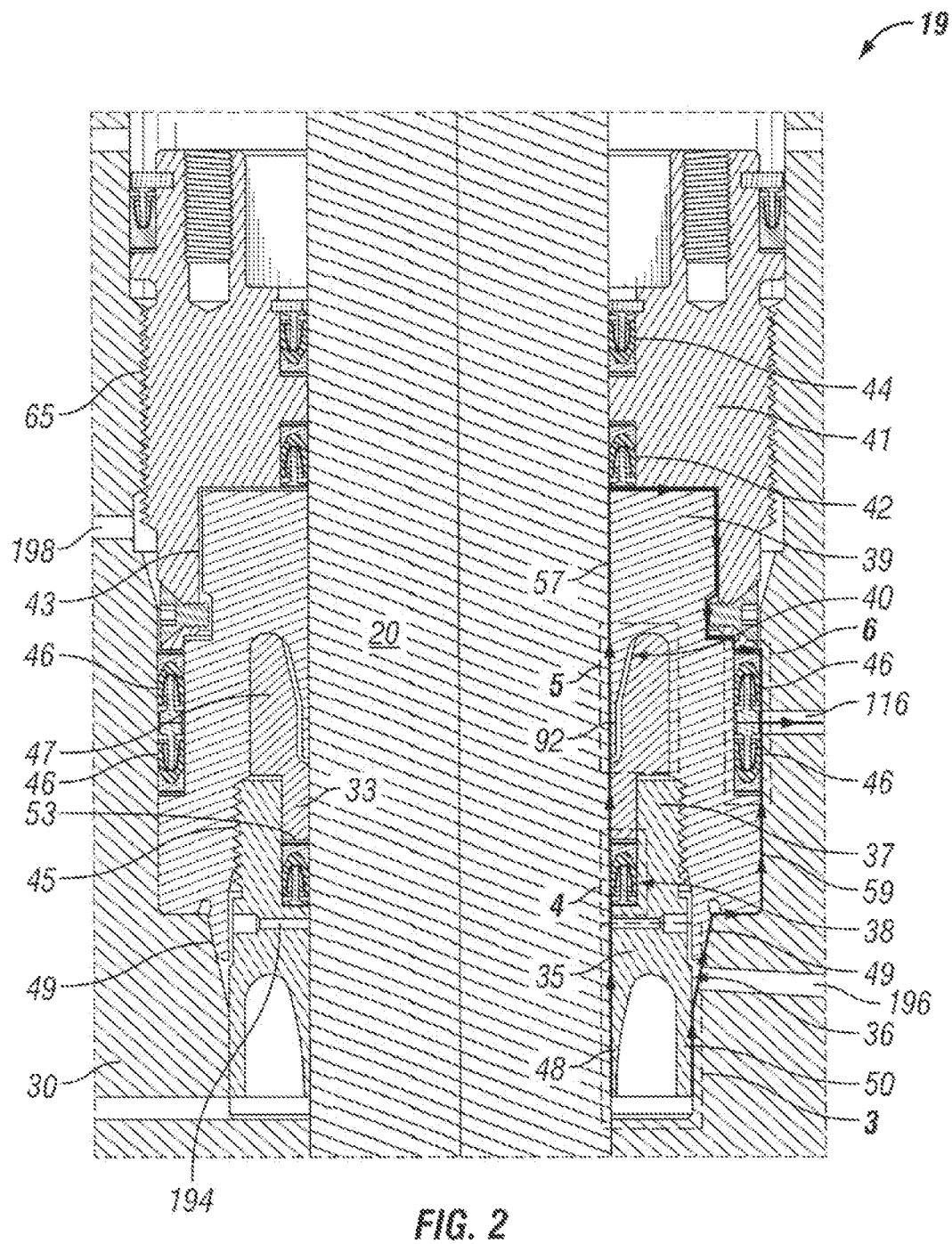
FIG. 2 is an enlarged side cross-sectional view of the multi-valve stem seal assembly corresponding to area 2 in FIG. 1.

In FIG. 2 there is shown a multi-valve stem seal assembly 19 of the present technology. The multi-valve stem seal assembly 19 includes a primary stem seal 36, a secondary stem seal 38, and a tertiary stem seal 40. The primary stem seal 36 includes a sealing portion 35 and an extended portion 37 that extends away from the flow passageway 22 substantially parallel to the stem 20. In addition, there are provided a leak vent seal 42, an actuator chamber seal 44, and check line seals 46. The primary, secondary, and tertiary stem seals 36, 38, and 40 are carried by a proximal cartridge body 39. As shown in FIG. 2, the extended portion 37 of the primary stem seal 36 may engage the proximal cartridge body 39 at a threaded interface 45. The proximal cartridge body 39 may include a secondary bonnet seal 49 configured to seal against a surface of the bonnet 30.

In some embodiments, the stem 20 may include a stem protrusion 192 that engages a surface 193 of the bonnet 30 when the gate is in the open position, as shown in FIG. 1. In such embodiments, the engagement between the stem protrusion 192 and the surface 193 of the bonnet 30 creates a backseat seal that is closer to the flow passageway 22 than the stem seal assembly 19. The stem protrusion 192 may be made of metal, so that it is resistant to corrosion, and has structural rigidity. The inclusion of such a backseat seal adds redundancy to the system, thereby further decreasing the risk of leaks between the stem 20 and the bonnet 30.

The leak vent and actuator chamber seals 42, 44 are carried by a distal cartridge body 41. In the embodiment shown, the proximal and distal cartridge bodies 39, 41 are connected to one another at a cartridge interface 43, with the distal cartridge body 41 partially surrounding a portion of the proximal cartridge body 39. The proximal and distal cartridge bodies 39, 41 are held together within the gate valve assembly 17 by the compression loads acting on the stem seal assembly 19 from above and below. In some embodiments, however, the proximal and distal cartridge bodies 39, 41 may be integral with one another, and form a single cartridge body. In addition, the distal cartridge body 41 may be threadedly engaged with the bonnet 30 at an interface 65. Also included in the embodiment of FIG. 1 is an annular spacer 47, positioned between the secondary stem seal 38 and the tertiary stem seal 40, and extending into a cavity behind the tertiary stem seal 40. The annular spacer 47 has a lower end 33 that fits into the annular space between the extended portion 37 of the primary stem seal 36 and the stem 20. One purpose of the annular spacer 47 is to restrain axial movement of the secondary stem seal 38 by providing a barrier to movement of the secondary stem seal 38 toward the tertiary stem seal 40. In alternate embodiments, the annular spacer 47 could be replaced with any mechanism capable of helping to maintain relative movement of the secondary stem seal 38 and the tertiary stem seal 40. For example, the annular spacer 47 could be replaced with a snap ring (not shown).

The multi-valve stem seal assembly 19 is designed to provide a multi-fault system for retaining pressurized fluids below the multi-valve stein seal assembly 19, and to prevent such fluids from passing between the stem seal assembly 19 and the stem 20. Each of the primary, secondary, and tertiary stem seals 36, 38, 40 has a different structure, as described in detail below, and each provides a secure seal against the stem 20 of the gate valve assembly 17. Each seal is structurally independent of the other seals, and is capable of sealing the space between the stem seal assembly 19 and the stem 20 independent of the other seals. Moreover, together these seals provide a redundancy that maintains the integrity of the interface between the multi-valve stem seal assembly 19 and the stem 20, even if one or two of the seals fail.

FIGS. 1 and 2 also show test ports 194, 195, 196, 197, and 198, which allow pressurized fluid to be introduced into the stem seal assembly 19 for purposes of testing the seals and interfaces of the stem seal assembly 19. For example, test port 195 provides a fluid path from outside the bonnet 30 into the area below the primary stem seal 36, thereby allowing the integrity of the primary stem seal 36 to be directly tested. Similarly, test ports 194 and 196 allow for the introduction of pressurized fluid to below the secondary stem seal 38, thereby allowing the integrity of the secondary stem seal 38 to be directly tested. The combination of structurally independent stem seals 36, 38, and 40, and the test ports, is beneficial because it allows for independent testing of the seals 36, 38, and 40, as well as interfaces around the stem seal assembly 19. Such independent testing of the seals 36, 38, and 40 simplifies the process of qualifying the seals to meet third party requirements, such as governmental regulations and customer requirements. Production valves may not incorporate these test ports.

Figure 3A:
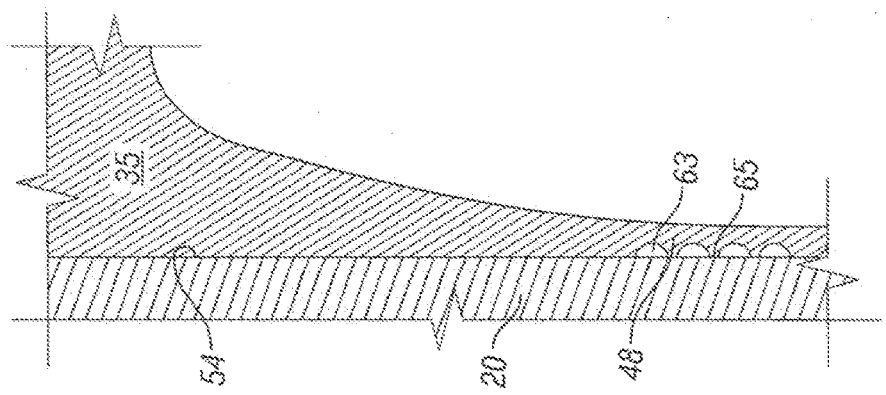
FIG. 3A is an enlarged cross-sectional view of the first primary stem seal leg according to an alternate embodiment of the present technology.
Figure 3:
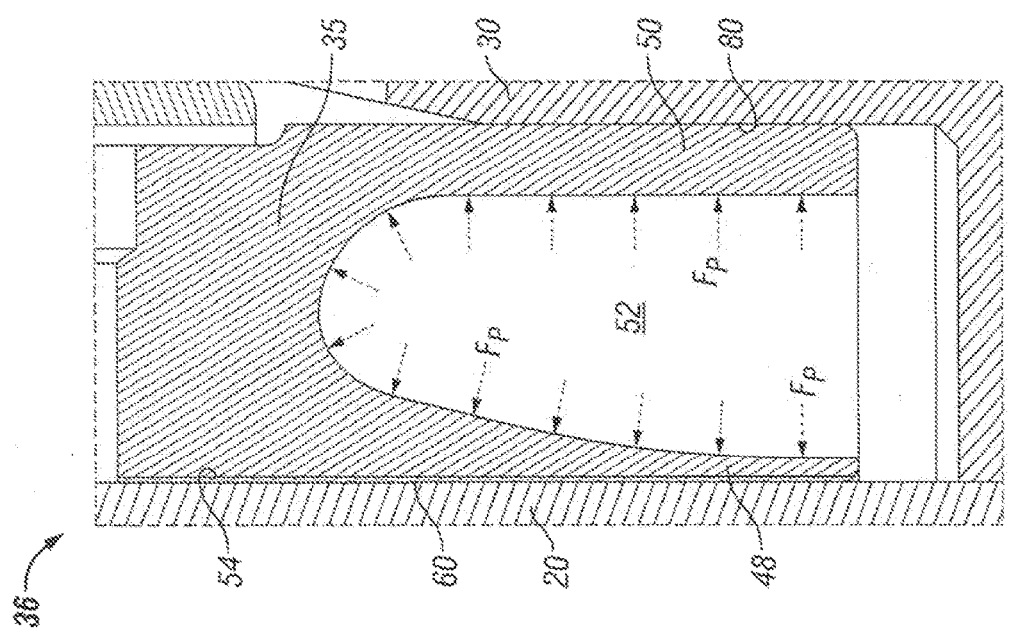
FIG. 3 is an enlarged side cross-sectional view of the primary stem seal corresponding to area 3 in FIG. 2.

In FIG. 3 there is a shown the sealing portion 35 of the primary stem seal 36. The sealing portion 35 of the primary stem seal 36 is substantially U-shaped, and is positioned between the bonnet 30 and the stem 20. A first primary stem seal leg 48 extends downwardly substantially adjacent to the stem 20, and a second primary stem seal leg 50 extends downwardly substantially adjacent to the bonnet 30. In practice the area 52 between the first and second primary stem seal legs 48, 50 fills with pressurized fluid, and the pressurized fluid exerts pressure forces $F_p$ outwardly from the area 52, including against the first and second primary stem seal legs 48, 50. The first primary stem seal leg is dynamic, so that as the pressure forces F, act on the first primary stem seal leg 48, it is pushed into sealed engagement with the stem 20 so that no fluid can pass between the primary stem seal 36 and the stem 20. In some embodiments, the first primary stem seal leg 48 may be resilient and biased against the stein 20 even before fluid pressure is applied. The second primary stem seal leg 50 is static, and may have a thicker cross-section than the first primary stem seal leg 48. The second primary stem seal leg 50 is configured to seal against the bonnet 30 so that no fluid can pass between the primary stem seal 36 and the bonnet 30. In alternative embodiments (not shown), the sealing portion 35 of the primary stem seal 36 may be symmetrical, with both the first and second primary stem seal legs 48, 50 being dynamic.

The sealing portion 35 of the primary stem seal 36 has a stem engaging surface 54 that is substantially straight in an axial direction, that surrounds the stem 20, and that is positioned adjacent to the stem 20. Such an arrangement is advantageous because it allows transmission of the pressure forces $F_p$ through the stem engaging surface 54 and into the stem 20 along the entire length of the sealing portion 35 of the primary stem seal 36. Thus, the stem 20 supports the primary stem seal 36. This design is in contrast to other known seal designs, many of which include a stem seal surface proximate to the stem 20 that tapers away from the stem 20 along part of the length of the seal. Such tapered designs can be problematic because they can lead to high stresses in the first primary stem seal leg 48, which can in turn lead to failure of the seal. In the design of the present technology, such stresses are minimized, thereby increasing the reliability of the first primary stem seal 36, as well as increasing the amount of pressure that the first primary stem seal 36 can withstand. Furthermore, the stem seal must also withstand the hydro-test pressures which test the valve for safety. These pressures can be 1.25 to 1.5 times the rated operating pressure of the valve.

In certain embodiments, such as that shown in FIG. 3, the stem engaging surface 54 of the first primary stem seal 36 may have a primary stem seal coating 60. Optionally, a similar coating (not shown) may be applied to a bonnet engaging surface 80 of the first primary stem seal 36. The primary stem seal coating 60 may be a high temperature resistant material, such as, for example, polyetherketoneketone (PEKK), or other similar material. The coating may also be non-polymeric, such as a tungsten carbide coating, or a coating of diamond-like carbon, or both. The provision of the primary stem seal coating 60 is advantageous because it allows the primary stem seal 36 to seal against the stem 20 and the bonnet 30 with a decreased amount of contact pressure compared to seals without such a coating. In addition, the first primary stem seal 36 itself may be made of metal, so that the seal between the primary stem seal 36 and the stem 20 and the bonnet 30 is a metal seal, having only the primary stem seal coating 60 therebetween. This is advantageous because metal seals are able to withstand higher temperatures and pressures than polymeric or plastic seals. In addition, metal seals are more resistant to corrosion, and more structurally robust.

In certain embodiments, such as that shown in FIG. 3A, the stem engaging surface of the first primary stein seal leg 48 may have recesses 63. In between the recesses 63 are contact points 65. The combination of recesses 63 and contact points 65 improves the sealing ability of the first primary stem seal leg 48 against the stem 20. For example, in embodiments that lack recesses 63, as the force $F_p$ pushes the first primary stem seal leg 48 against the stem 20, the force $F_p$ is distributed along the entire stem engaging surface 54. Thus, the entire stem engaging surface 54 creates a seal against the stem 20. In the embodiment shown in FIG. 3A, however, only the contact points 65 contact the stem 20. This means that, over the portion of the stem engaging surface having recesses 63 and contact points 65, all of the force $F_p$ is concentrated to the contact points 65. Since the surface area of the contact points 65 that engages the stem 20 is small, each contact 65 point is pressed against the stem 20 with more force than would be applied at the same place in the absence of the recesses 63. This additional localized force between the contact points 65 improves the seal between the stem engaging surface 54 and the stem 20.

Although FIG. 3A shows the recesses 63 and contact points 65 on the first primary stem seal leg 48 of the primary stem seal, it is to be understood that the description applies equally to similar seals throughout the seal assembly. For example, similar recesses and contact points could be used to improve the seal between the second primary stem seal leg 50 and the bonnet 30 (shown in FIG. 3), and between the first primary seat seal leg 132 of the primary seat seal 124 against the valve body 28 (shown in FIG. 9).

Figure 4A:
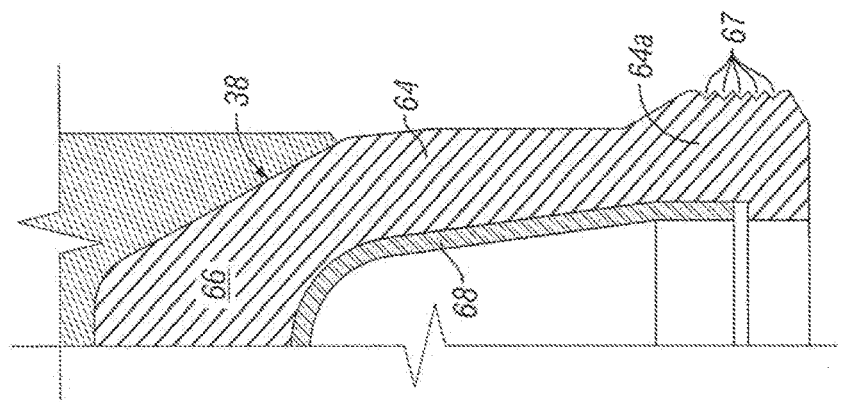
FIG. 4A is an enlarged side cross-sectional view of the second secondary stem seal leg according to an alternate embodiment of the present technology.
Figure 4:
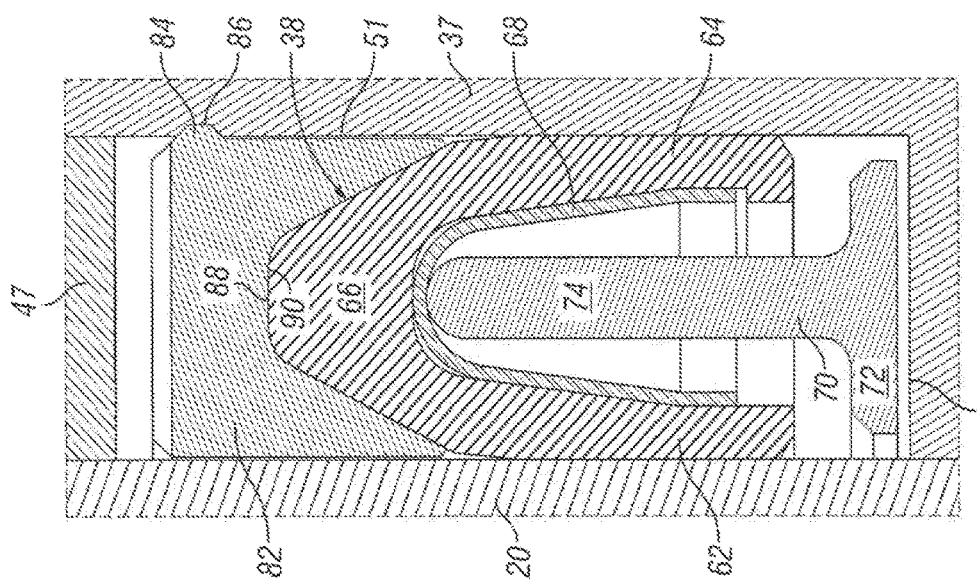
FIG. 4 is an enlarged side cross-sectional view of the secondary stem seal corresponding to area 4 in FIG. 2.

Referring now to FIG. 4, there is shown the secondary stem seal 38, according to an embodiment of the multi-valve stem seal assembly 17. The secondary stem seal 38 is substantially U-shaped, having first and second secondary stem seal legs 62, 64. Furthermore, the secondary stem seal 38 is positioned between the stem 20 and an extended portion 37 of the primary stem seal 36. The secondary stem seal 38 includes a secondary stem seal jacket 66 and a secondary stem seal spring 68. The secondary stem seal spring 68 is positioned within the secondary stem seal jacket 66 and is configured to maintain an outward spring force on the first and second secondary stem seal legs 62, 64, thereby pushing the legs toward, and into sealed engagement with, the stem 20 and the extended portion of the primary stem seal 36, respectively. In some embodiments, the stem seal jacket 66 may be made of plastic, such as, for example, polytetraflouroethylene (PTFE), or 15% carbon-filled PTFE. The secondary stem seal spring 68 may be made of metal, such as, for example, Elgiloy.

In certain embodiments, a stem standoff ring 70 may be provided to help maintain the axial position of the secondary stem seal 38 relative to the primary stem seal 36. The stem standoff ring 70 may include a base portion 72 and a supporting extension 74. In the embodiment shown in FIG. 4, the base portion 72 is positioned adjacent a transverse surface 76 of the primary stem seal 36, and the supporting extension 74 extends from the base portion 72 upwardly into the space between the first and second secondary stem seal legs 62, 64. In alternative embodiments, the stem standoff ring 70 may be integral to the primary stem seal 36. The stem standoff ring 70 functions to prevent the secondary stem seal 38 from moving downward relative the primary stem seal 36, because as the secondary stem seal 38 moves downward, the secondary stem seal spring 68 contacts the top of the supporting extension 74 of the stem standoff ring 70. The stem standoff ring 70 is prevented from moving downward because the base portion 72 contacts the transverse surface 76 of the primary stem seal 36. Thus, downward movement of the secondary stem seal 38 is limited. In some embodiments, the stem standoff ring 70 may be made of a plastic material. Alternatively, the stem standoff ring 70 may be made of a metal, such as Inconel, to provide additional strength, or resistance to high temperatures or pressures.

Also shown in FIG. 4 is a stem anti-extrusion ring 82, which may be positioned above the secondary stem seal 38 to prevent the secondary stem seal 38 from re-shaping and extruding. For example, because the secondary stem seal 38 is polymeric, it may reshape, or reform, when exposed to high temperatures, such as temperatures above about 500 to 600 degrees Fahrenheit. However, in some applications, it is possible that pressure will build up behind the secondary stem seal 38 (i.e., above the secondary stem seal 38, as shown in the drawings), and will therefore need to escape by passing around the secondary stem seal 38 toward the fluid passageway 22 (i.e., to below the secondary stem seal 38, as shown in the drawings). If the secondary stem seal 38 reforms under high heat, it may form an upward seal between the extended portion 37 of the primary seat seal 36 and the stem 20, which upward seal would prevent pressure behind the secondary stem seal 38 from escaping. This could damage, or even destroy, the secondary stem seal 38. To prevent such reforming of the secondary stem seal 38, the stem anti-extrusion ring 82 has a lower surface 88 that is positioned adjacent to, and may partially surround, an upper surface 90 of the secondary stem seal jacket 66. Engagement of the lower surface 88 of the stem anti-extrusion ring 82 with the upper surface 90 of the secondary stem seal jacket 66 limits or prevents the reshaping of the secondary stem seal 38.

Stem anti-extrusion ring 82 also includes a protrusion tab 84 on an outer diameter thereof, and partially circumscribing the extended portion 37 of the primary stem seal 36. The protrusion tab 84 forces intermittent contact with extended surface 37. Engagement of the protrusion tab 84 is designed to maintain a gap 51 between the stem anti-extrusion ring 82 and the extended portion 37 of the primary stem seal 36 so that the anti-extrusion ring 82 does not seal against the extended portion 37 of the primary stem seal 36. The purpose of the gap 51 is to provide a way for pressure behind the stem anti-extrusion ring 82 to escape around the ring 82.

FIG. 4A shows an outer profile of second secondary stem seal leg 64 when the secondary stem seal jacket 66 is not disposed between the extended portion 37 of the primary stem seal 36 and the stem 20. As can be seen, the end 64a of the second secondary stem seal leg 64 may taper outwardly and have an expanded outer diameter. Thus, the end of the second secondary stem seal leg 64 may be thicker than other portions of the second secondary stem seal leg 64. This increased thickness helps to increase the seal between the second secondary stem seal leg 64 and the extended portion 37 of the primary stem seal 36.

In some embodiments, the end 64a of the second secondary stem seal leg 64 can also have grooves 67 in the surface thereof. In the embodiment shown in FIG. 4A, these grooves 67 circumscribe the second secondary seal leg 64. The grooves 67 serve to increase the sealing ability of the second secondary stem seal leg 64 against the extended portion 37 of the primary stem seal 36 by eliminating channels that may be used by fluids to pass between the second secondary stem seal leg 64 and the extended portion 37 of the primary stem seal 36.

For example, during the manufacture and machining of the conventional stem seal jackets, the stem seal jackets may be turned on a lathe as the outer profile of the stem seal jackets are cut. As the cutting tool attached to the lathe moves along the surface of the stem seal jackets from the representative end 64a of the second secondary stem seal leg 64 toward the upper surface 90, or vice versa, the tool may leave a continuous very small groove on the outer surface of the seal jackets, similar to a very shallow thread. In operation, the very small groove may at times create a passageway, which fluid below the seal can follow to leak past the seal, even when the seal is energized and the second stem seal leg is fully engaged. In the present technology, material stock is left on the inner diameter of the stem seal leg 64, and the machine takes cuts of a defined shape and depth, thereby forming grooves 67. The grooves 67 are deeper than this very shallow groove left over from the manufacturing process, and interrupt the flow of fluid past the seal. In this way the grooves 67 increase the sealing ability of the second secondary stem seal leg 64.

Although FIG. 4A shows the end 64a of secondary stem seal leg 64, including grooves 67, it is to be understood that the description applies equally to the ends of the first secondary stem seal leg 62, first and second check line seal legs 104, 106 (shown in FIG. 6), and first and second secondary seat seal legs 142, 144 (shown in FIG. 11), as well as any other similar seals.

Figure 5:
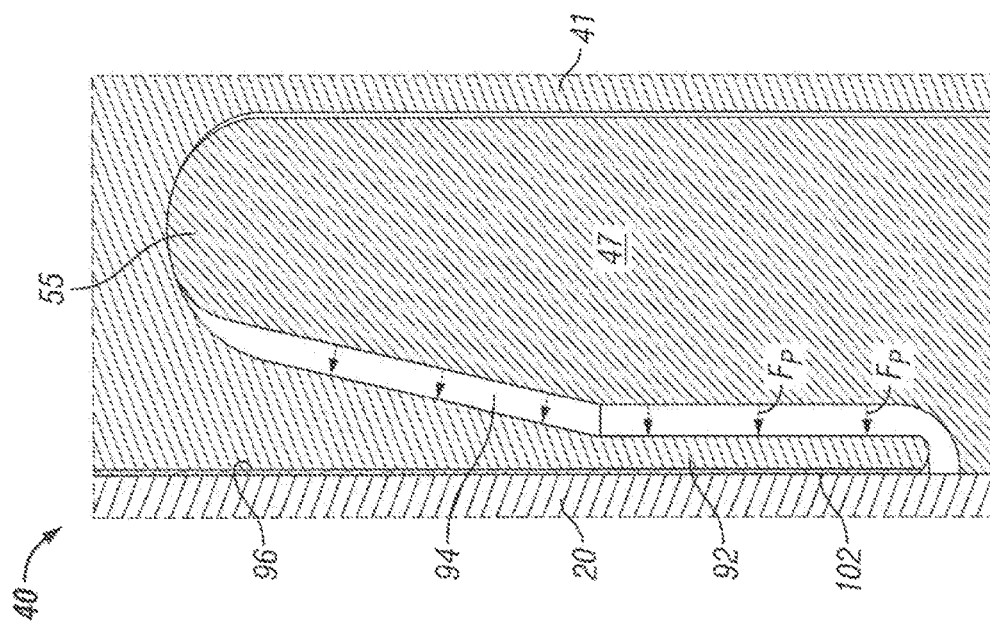
FIG. 5 is an enlarged side cross-sectional view of the tertiary stem seal corresponding to area 5 in FIG. 2.

FIG. 5 shows the tertiary stem seal 40, which includes a tertiary stem seal leg 92 adjacent the stem 20. In the embodiment shown, the tertiary stem seal 40 is integral to the distal cartridge body 41. One purpose of the tertiary stem seal 40 is to provide an additional seal between the bonnet 30 and the stem 20 in case the primary and secondary seals are inadequate. The tertiary stem seal 40 functions similarly to the primary stem seal 36 in that if pressurized fluid enters the area 94 on the inside of the tertiary stem seal leg 92, the pressurized fluid will exert a pressure force $F_p$ against the tertiary stem seal leg 92. As the pressure force $F_p$ acts on the tertiary stem seal leg 92, it is pushed into sealed engagement with the stem 20 so that no fluid can pass between the tertiary stem seal 40 and the stem 20. The area adjacent the tertiary stem seal leg 92 is at least partially filled by the annular spacer 47. As shown in FIG. 2, and discussed above, the purpose of the annular spacer 47 is to maintain the axial position of the secondary stem seal 38. To this end, the bottom 53 of the annular spacer 47 is positioned proximate the stem anti-extrusion ring 82, which in turn contacts the upper surface 90 of the stem seal jacket, while the top 55 of the annular spacer 47 contacts the surface of the distal cartridge body 41 adjacent the tertiary stem seal 40.

Similar to the primary stem seal 36, the tertiary stem seal 40 may also have a stem engaging surface 96 that is substantially straight as shown in the drawings. The stem engaging surface 96 surrounds, and is substantially coaxial with, the stem 20, and is positioned adjacent the stem 20. Such an arrangement is advantageous because it allows transmission of the pressure force $F_p$ through the stem engaging surface 96 and into the stem 20 along the entire length of the tertiary stem seal 40. Thus, the stem 20 supports the tertiary stem seal 40. As discussed above with respect to the primary stem seal 36, this design is in contrast to known seal designs, many of which include a stem seal surface that tapers away from the stem 20 along part of the length of the seal. Such tapered designs can be problematic because they can lead to high stresses in the upper part of the tertiary stem seal leg 92, which can in turn lead to failure of the seal. In the design of the tertiary stem seal 40, such stresses are eliminated, thereby increasing the reliability of the tertiary stem seal 40, as well as increasing the amount of pressure that the tertiary stem seal 40 can withstand. As shown in FIG. 5, the lower portion of the tertiary stem seal leg 92 may have a constant thickness, which gradually increases toward the top of the tertiary stem seal leg 92.

In certain embodiments, the stem engaging surface 96 of the tertiary stem seal 40 may have a tertiary stem seal coating 102. The tertiary stem seal coating 102 may be a high temperature resistant material, such as, for example, PEKK, or other similar material. The tertiary stem seal 40 may be made of metal. This is advantageous because metal seals are able to withstand higher temperatures and pressures than polymeric or plastic seals. In addition, metal seals are more resistant to corrosion, and more structurally robust.

Figure 6:
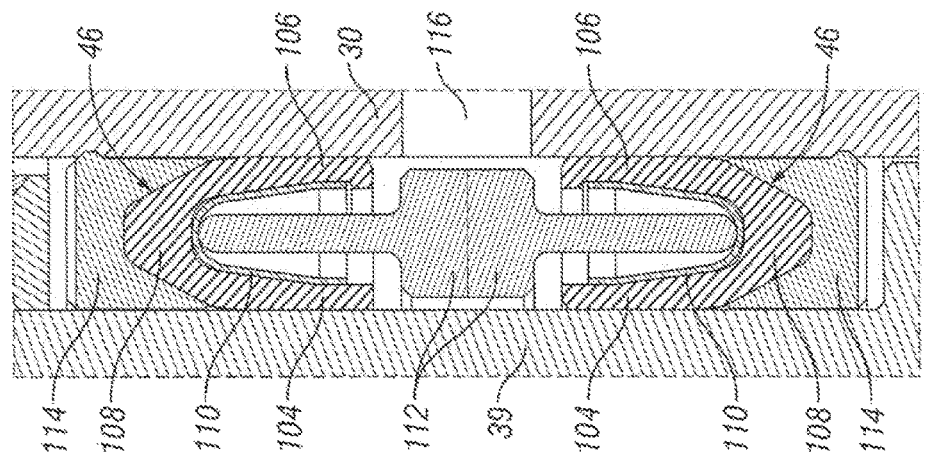
FIG. 6 is an enlarged side cross-sectional view of the check line seals corresponding to area 6 in FIG. 2.

Referring now to FIG. 6, there are shown check line seals 46. Each check line seal 46 is located at a place where a check line 116 connects to the stem seal assembly 19. As best shown in FIG. 1, at least one check line 116 connects the stem seal assembly 19 to the environment outside the bonnet, such as, for example, the ocean. The purpose of the check line 116 is to allow fluids that may enter the stem seal assembly past the seals 36, 38, 40, 49 to escape through the check line 116, thereby preventing such fluids from entering the actuation chamber (not shown) located above the stem seal assembly 19. For example, if the primary, secondary and tertiary stem seals 36, 38, 40 were to fail, fluid would leak around such seals according to path 57, shown in FIG. 2. As can be seen, such fluid would flow through the stem seal assembly and ultimately be channeled through the check line 116. Alternatively, if fluid were to leak past the second primary stem seal leg 50 and the secondary bonnet seal 49, it would be according to path 59. As can be seen, such fluid would flow around the stem seal assembly and ultimately be channeled through the check line 116. Typically such a check line 116 includes a check valve (not shown) that prevents backflow of seawater from entering the stem seal assembly 19 through the check line 116. Sometimes, however, check valves leak. Accordingly, it is advantageous to provide additional check line seals 46 between the proximal cartridge body 39 and the bonnet 30, as shown in FIGS. 2 and 6, to prevent such leakage from entering the stem seal assembly 19.

Referring to FIG. 6, each check line seal 46 is similar in structure to the secondary stem seal 38 discussed above. In particular, each check line seal 46 is U-shaped and includes first and second check line seal legs 104, 106. In addition, each check line seal 46 includes a check line seal jacket 108, a check line seal spring 110, a check line seal stem standoff ring 112, and a check line seal stem anti-extrusion ring 114. The structure of each of these components is substantially similar to that of corresponding components of the secondary stem seal 38, discussed above in reference to FIG. 4. In particular, the check line seal stem anti-extrusion rings 114 are configured to prevent the check line seals 46 from reforming under high temperature, thereby enabling fluid within the stem seal assembly 19 to flow around the check line seals 46 from behind, and into the check line 116.

Referring back to FIG. 2, there is shown the leak vent seal 42 and the actuator chamber seal 44 of the multi-valve stem seal assembly 19. The leak vent seal 42 is yet another backup seal, meant to seal between the stem 20 and the distal cartridge body 41 if the primary, secondary, and tertiary seals 36, 38, and 40 should fail. Structurally, it is the same or similar to the secondary stem seal 38, discussed in detail above. The actuator chamber seal 44 is also positioned between the stem 20 and the distal cartridge body 41, but is reversed from the leak vent seal 42. The actuator chamber seal 44 is arranged to prevent fluid from entering the stem seal assembly 19 from the actuation chamber (not shown). The actuator chamber seal 44 is also structurally the same or similar to the secondary stem seal 38.

Seat Seal Assembly

Figure 7:
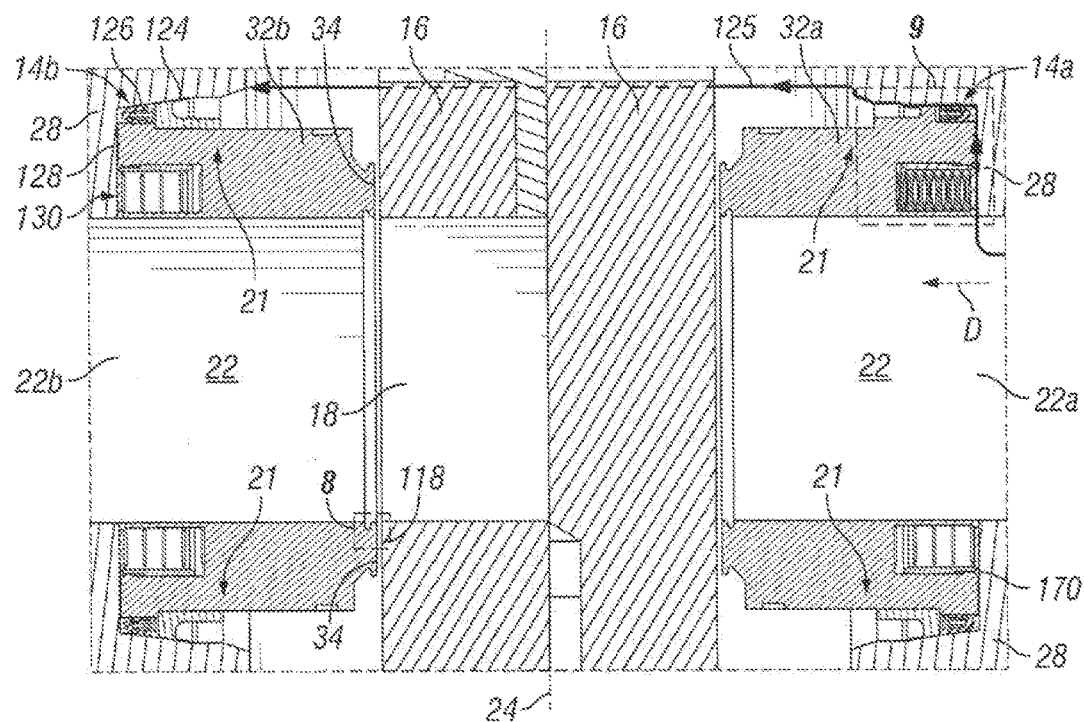
FIG. 7 is an side cross-sectional view of the valve body, seat rings, and gate according to an embodiment of the present technology, including the multi-valve seat seal assembly.

In FIG. 7 there is shown a multi-valve seat seal assembly 14 according to an exemplary embodiment of the present technology. The arrangement shown in FIG. 7 is a gate valve capable of bi-directional flow through the flow passageway 22, and includes seat rings 32 that are positioned on either side of the gate 16 between the valve body 28 and the gate 16, and that circumscribe the flow passageway 22. If fluid is flowing through the fluid passageway 22 in a direction D, the portion of the flow passageway 22 to the right of the gate 16 is the upstream flow passageway 22a, and the portion to the left of the gate 16 is the downstream flow passageway 22b. Similarly, the seat ring 32 and valve assembly 14 on the upstream side of the gate 16 is the upstream seat ring 32a and the upstream seat sealing assembly 14a, and those on the downstream side are the downstream seat ring 32b and the downstream seat sealing assembly 14b, respectively. When the gate 16 is closed, the fluid is prevented from flowing directly between the upstream flow passageway 22a and the downstream flow passageway 22b through the opening 18. However, the fluid may still circumvent the gate 16 by flowing past the upstream seat ring 32a, and around the gate 16 to the downstream seat ring 32b, as indicated by the path 125. However, the downstream seat sealing assembly 14b, located between the downstream seat ring 32b and the valve body 28, prevents the fluid from entering the downstream fluid passageway 22b. If the direction of flow D were reversed, the gate valve would function the same way, except that the upstream and downstream seat rings 32a, 32b and seat seal assemblies 14a, 14b would be reversed. In FIG. 7, the gate 16 is shown in an open position to the left of the centerline 24, and in a closed position to the right of the centerline 24.

Figure 8:
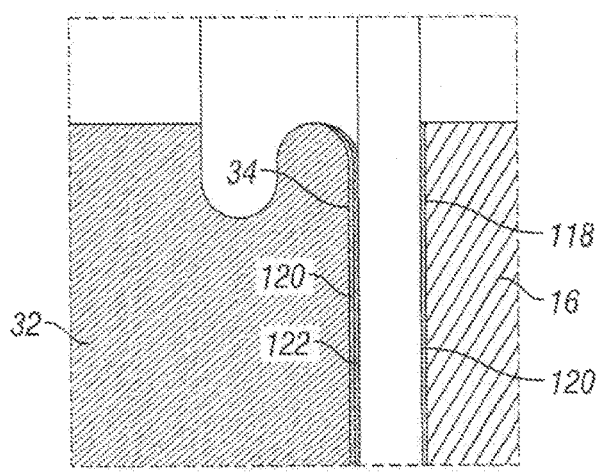
FIG. 8 is an enlarged side cross-sectional view of a portion of a seat ring and the gate corresponding to area 8 in FIG. 7.

Each seat ring 32 has a face 34 that is positioned adjacent the gate 16 and that guides the gate 16. Referring to FIG. 8, there is shown an enlarged view of a portion of a seat ring face 34 and a surface 118 of the gate 16. One or both the faces 34, 118 of the seat ring face 32 and the gate 16 may be coated with a first hard coating 120 such as, for example, tungsten carbide. In addition, a second hard coating 122 such as, for example, diamond like carbon, may be deposited on the first hard coating 120. In FIG. 8, the first hard coating 120 is shown on both the face 34 of the seat ring 32 and the surface 118 of the gate 16, while the second hard coating 122 is shown only on the surface 34 of the seat ring 32. However, the first or second hard coatings 120, 122 may be applied to either surface, either alone or in combination, as desired. One purpose of the hard coatings is to lengthen the life of the seat rings 32 and the gate 16 by hardening the surfaces of each to reduce wear as they come into contact and move relative to one another. Another purpose for the use of hard coatings, like diamond-like carbon, is to reduce friction, in order to enable operation without lubrication.

Figure 9:
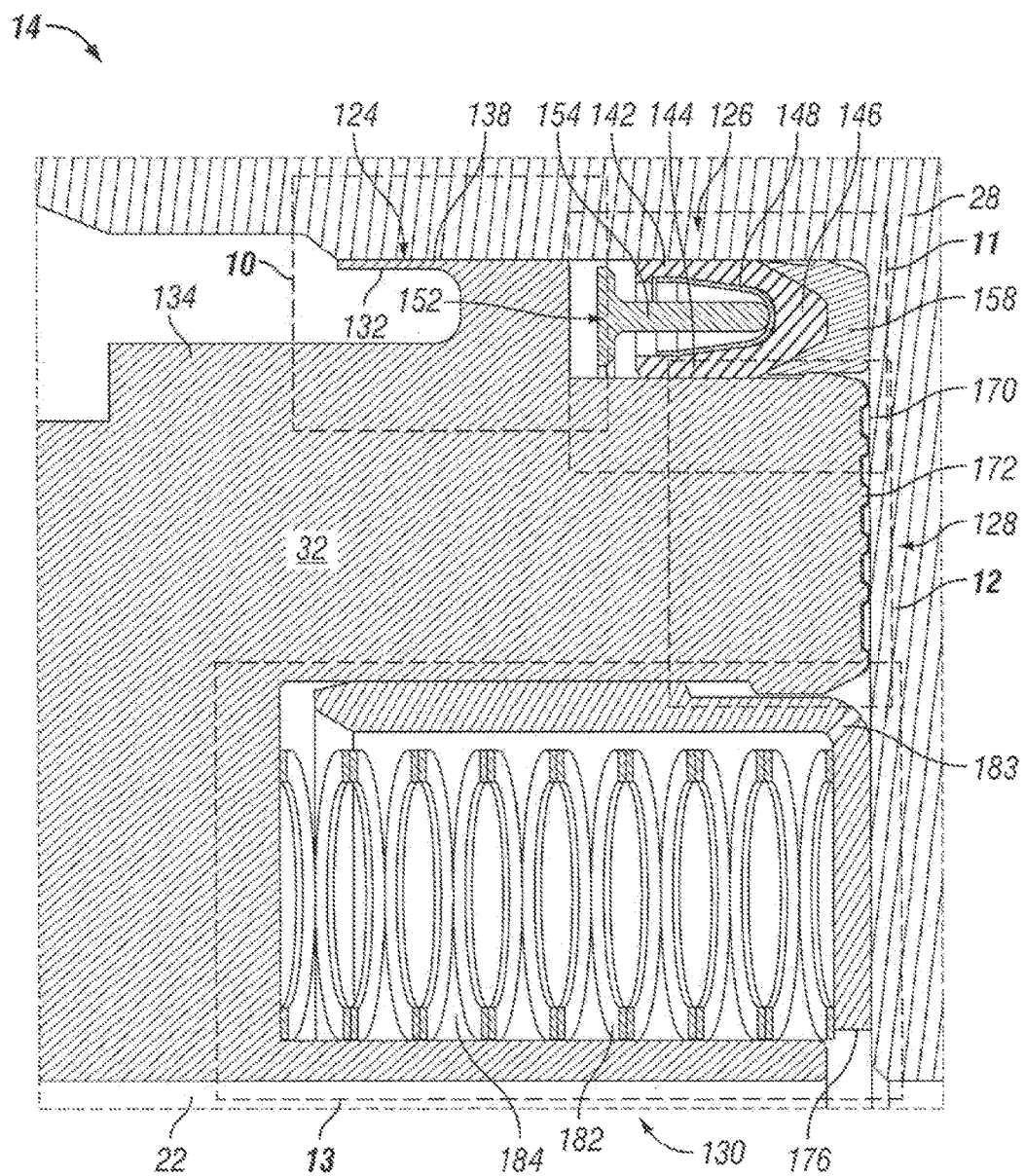
FIG. 9 is an enlarged side cross-sectional view of the multi-valve seat seal assembly corresponding to area 9 in FIG. 7.

As best shown in FIG. 9, at the interface between each seat ring 32 and the valve body 28 is the multi-valve seat seal assembly 14, including a primary seat seal 124, a secondary seat seal 126, and a tertiary seat seal 128. In addition, there is provided a sand excluder 130. The multi-valve seat seal assembly 14 is designed to provide a multi-fault system for preventing pressurized fluids from passing between the seat rings 32 and the valve body 28. Each of the primary, secondary, and tertiary seat seals 124, 126, 128 has a different structure, as described in detail below, and each provides a secure seal between a seat ring 32 and the valve housing 28. Each seal is structurally independent of the other seals, and is capable of sealing the space between each seat ring 32 and the valve body 28 independent of the other seals. Moreover, together these seals provide a redundancy that maintains the integrity of the interface between each seat ring 32 and the valve body 28, even if one or two of the seals fail.

Figure 10:
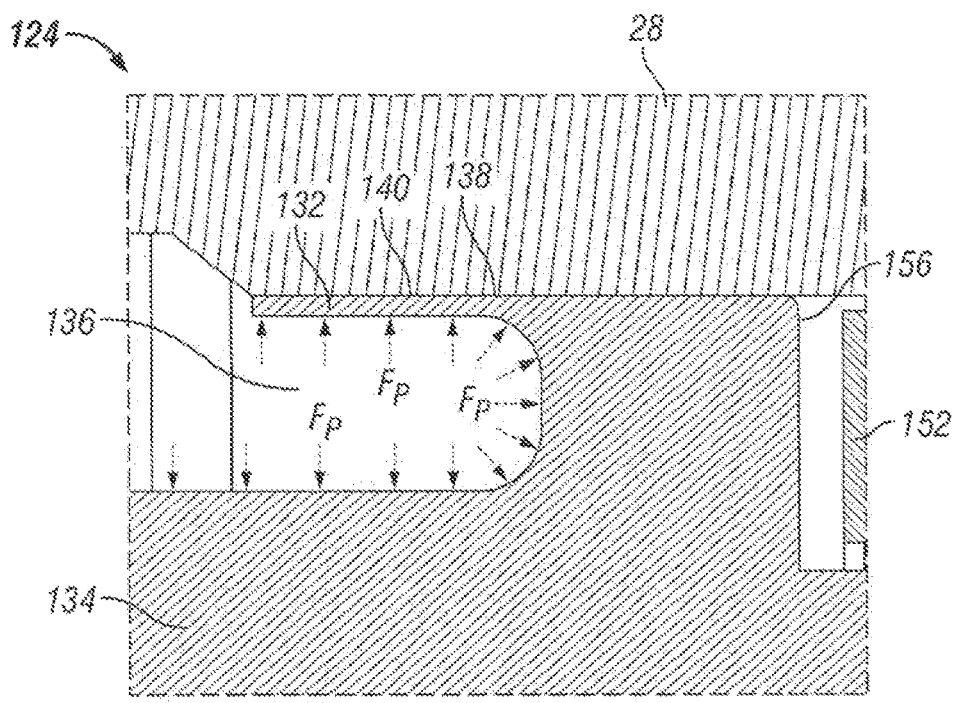
FIG. 10 is an enlarged side cross-sectional view of the primary seat seal corresponding to area 10 in FIG. 9.

In FIG. 10 there is shown an enlarged view of the primary seat seal 124. The primary seat seal is generally U-shaped, and is positioned between a seat ring 32 and the valve body 28. A first primary seat seal leg 132 extends inwardly toward the gate 16 and the stem 20 substantially adjacent to a first sealing surface 138 of the valve body 28. The first sealing surface 138 may be substantially cylindrical, as shown in FIGS. 9 and 10. The first primary seat seal leg 132 may have a constant thickness, and its outer side may be tapered or parallel to the direction of motion to mate with the first sealing surface 138. A second primary seat seal leg 134 extends inwardly substantially adjacent to the seat ring 32, and may be integral with the seat ring 32, as shown in FIGS. 9 and 10. Alternatively, the second primary seat seal leg 134 may be coaxial with the seat ring 32, and have a threaded inner diameter that engages threads on the outer surface of the seat ring 32. In such an embodiment, a free end of the second primary seat seal leg 134 may extend from the threaded section, and have a sealing surface biased against the outer surface of the seat ring. In practice, the area 136 between the first and second primary seat seal legs 132, 134 fills with pressurized fluid, and the pressurized fluid exerts a pressure force $F_p$ outwardly from the area 136, including against the first and second primary seat seal legs 132, 134.

The first primary seat seal leg 132 is dynamic, so that as the pressure force $F_p$ acts on the first primary seat seal leg 132, it is pushed into sealed engagement with the first sealing surface 138 of the valve body 28 so that no fluid can pass between the primary seat seal 124 and the valve body 28. In addition, the provision of a dynamic first primary seat seal leg 132 is desirable both because it allows fluid to flow past the seal from behind when the seat ring is on the upstream side of a closed gate, and it allows the seal to slide against the valve body as the seat ring 32 moves relative to the valve body. The second primary seat seal leg 134 is static, and may have a thicker cross-section than the first primary seat seal leg 132. In embodiments where the second primary seat seal leg 134 is not integral to the seat ring 32, the second primary seat seal leg 134 may be configured to seal against the seat ring 32 so that no fluid can pass between the primary seat seal 124 and the seat ring 32. In alternative embodiments (not shown), the primary seat seal 124 may be symmetrical, with both the first and second primary seat seal legs 132, 134 being dynamic.

In certain embodiments, such as that shown in FIG. 10, the surface of the first primary seat seal leg 132 may have a primary seat seal coating 140. Optionally, a similar coating (not shown) may be applied to the first sealing surface 138 of the valve body 28. The primary seat seal coating 140 may be a high temperature resistant material, such as, fir example, PEKK, or other similar material. The provision of the primary seat seal coating 140 is advantageous because it allows the primary seat seal 124 to seal against the valve body 28 with a decreased amount of contact pressure compared to seals without such a coating. In addition, because of tolerances between the gate 16, the seat rings 32, and the valve body 28, the seat rings 32 and seals 124, 126, 128 will move back and forth relative to the valve body 28 as pressure forces and the direction of fluid flow through the gate valve change. The provision of a polymeric or plastic primary seat seal coating 140 will help to reduce friction between the primary seat seal 124 and the valve body 28, thereby enabling such movement.

In addition, the first primary seat seal 124 may be made of metal, so that the seal between the primary seat seal 124 and the valve body 28 is a metal seal, having only the primary seat seal coating 140 therebetween. This is advantageous because metal seals are able to withstand higher temperatures and pressures than polymeric or plastic seals. In addition, metal seals are more resistant to corrosion, and more structurally robust.

Figure 11:
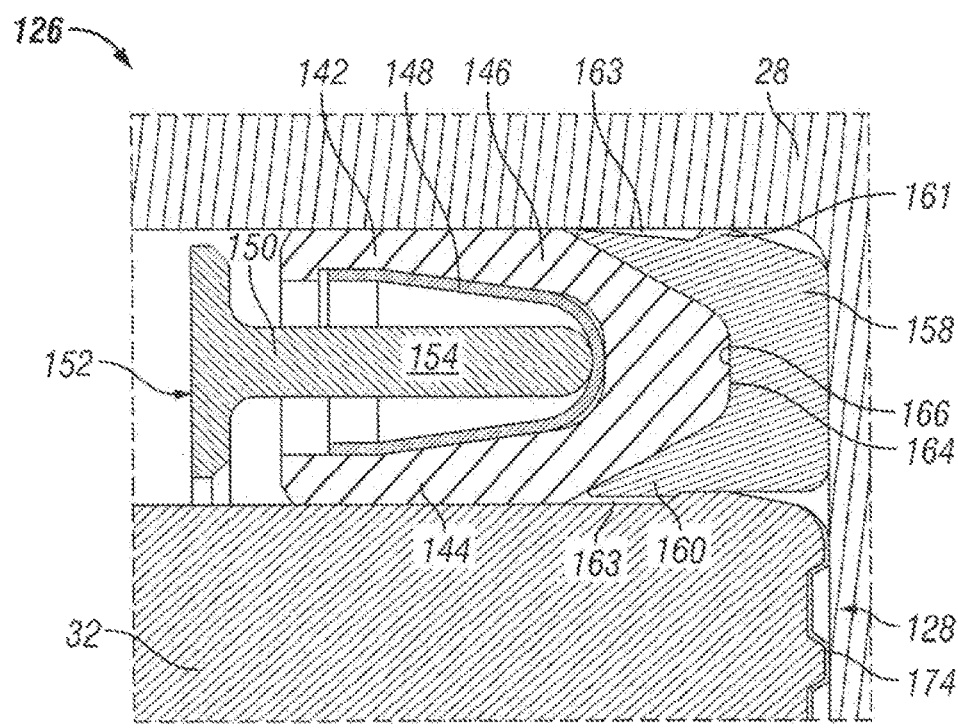
FIG. 11 is an enlarged side cross-sectional view of the secondary seat seal corresponding to area 11 in FIG. 9.

Referring now to FIG. 11, there is shown the secondary seat seal 126, according to an embodiment of the present technology. The secondary seat seal 126 is substantially U-shaped, having first and second secondary seat seal legs 142, 144. Furthermore, the secondary seat seal 126 is positioned between the valve body 28 and the seat ring 32. The secondary seat seal 126 includes a secondary seat seal jacket 146 and a secondary seat seal spring 148. The secondary seat seal spring 148 is positioned within the secondary seat seal jacket 146 and is configured to maintain an outward spring force on the first and second secondary seat seal legs 142, 144, thereby pushing the legs toward, and into sealed engagement with, the valve body 28 and the seat ring 32, respectively. In some embodiments, the seat seal jacket 146 may be made of plastic, such as, for example, PTFE, or 15% carbon-filled PTFE. The secondary seat seal spring 148 may be made of metal, such as, for example, Elgiloy.

In certain embodiments, a seat standoff ring 150 may be provided to help maintain the lateral position of the secondary seat seal 126 relative to the primary seat seal 124. The seat standoff ring 150 may include a base portion 152 and a supporting extension 154. In the embodiment shown in FIG. 11, the base portion 152 is positioned adjacent an outer surface 156 of the primary seat seal 124, and the supporting extension 154 extends from the base portion 152 laterally into the space between the first and second secondary seat seal legs 142, 144. The seat standoff ring 150 functions to prevent the secondary seat seal 126 from moving laterally inward toward the primary seat seal 124, because as the secondary seat seal 126 moves inward, the secondary seat seal spring 144 contacts the top of the supporting extension 154 of the seat standoff ring 150. The seat standoff ring 150 itself is prevented from moving laterally inward because the base portion 152 contacts the outer surface 156 of the primary seat seal 124. Thus, lateral inward movement of the secondary seat seal 126 is limited. In some embodiments, the seat standoff ring 150 may be made of a plastic material. Alternatively, the seat standoff ring 150 may be made of a metal, such as Inconel, to provide additional strength, or resistance to high temperatures or pressures.

Also shown in FIG. 11 is a seat anti-extrusion ring 158, which may be positioned laterally outward from the secondary seat seal 126 to prevent the secondary seat seal 126 from re-shaping and extruding. For example, because the secondary seat seal 126 is polymeric, it may reshape, or reform, when exposed to high temperatures, such as temperatures above about 500 to 600 degrees Fahrenheit. However, when the seat ring 32 is positioned adjacent the upstream side of the flow passageway 22, it is desirable to allow fluid to flow past the secondary seat seal 126 from behind. If the secondary seat seal 126 reforms under high heat, it may form a seal against such backward flow around the secondary seat seal 126. This could damage, or even destroy, the secondary seat seal 126. To prevent such reforming of the secondary seat seal 126, the seat anti-extrusion ring 158 has an inner surface 164 that is positioned adjacent to, and may partially surround, an outer surface 166 of the secondary seat seal jacket 142. Engagement of the inner surface 164 of the seat anti-extrusion ring 158 with the outer surface 166 of the secondary seat seal jacket 142 limits or prevents the reshaping of the secondary seat seal 126.

Seat anti-extrusion ring 158 also includes protrusion tabs 160, 161 extending from a surface thereof and partially circumscribing an inner and outer diameter, respectively, of the anti-extrusion ring 158. Engagement of the protrusion tabs 160, 161 is designed to maintain gaps 163 between the seat anti-extrusion ring 158 and both the seat ring 32 and the valve body 28. The purpose of the gaps 153 is to provide a path for fluid behind the seat anti-extrusion ring 158 to pass around the ring when the seat ring 32 is on the upstream side of the valve gate. In alternate embodiments, the protrusion tabs 160 may be located on only one side of the seat anti-extrusion ring 158.

Figure 12:
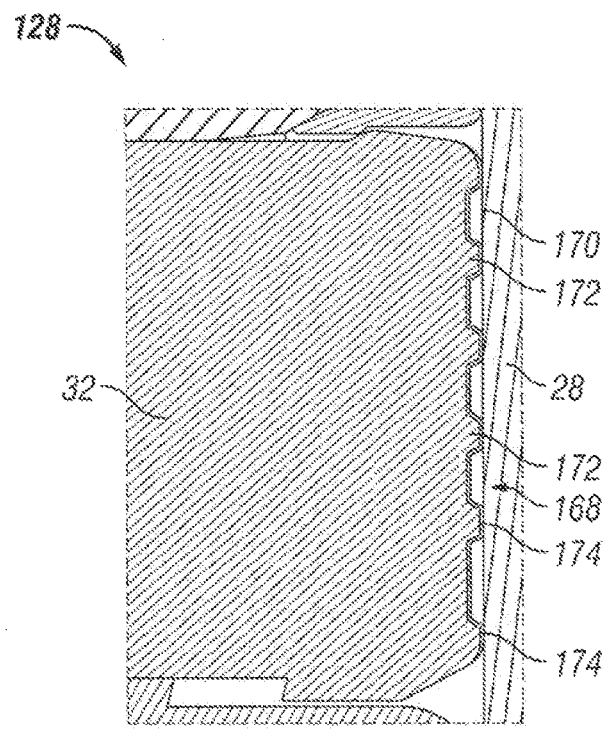
FIG. 12 is an enlarged side cross-sectional view of the tertiary seat seal corresponding to area 12 in FIG. 9.

FIG. 12 shows the tertiary seat seal 128 of the multi-valve seat seal assembly 14. The tertiary seat seal 128 has a flat sealing face 168 that is aligned substantially parallel to an end face 170 of the counterbore 21 in the valve body 28. The end face 170 may also be flat. As discussed above, in use each seat ring 32 (best shown in FIGS. 7 and 9) is capable of some lateral movement between the gate 16 and the end face 170, which movement is allowed because of tolerances between the valve components, such as the gate 16, the seat ring 32, and the valve body 28. As the seat ring 32 moves away from the end face 170, contact between the sealing face 168 and the valve body 28 may be broken. In contrast, when the seat ring 32 moves back toward the end face 170, such contact may be reestablished. Thus, the tertiary seat seal 128 is a face seal that is meant to be repeatedly broken and reformed.

The sealing face 168 of the tertiary seat seal 128 may have one or more circular ribs 172 extending therefrom. Circular ribs 172 may be continuous circular members concentric with seat ring 32. As shown in FIG. 12, the circular ribs 172 may be spread across the sealing surface 168. Alternatively, the circular ribs 172 may be arranged in some other configuration, such as concentrated at one end or the other of the sealing surface 168. Optionally, the sealing surface may be coated with a hard coating 174 such as, for example, tungsten carbide, to protect the sealing surface 168 from repeated contact with the end face 170 of the counterbore 21 in the valve body 28. Alternatively, the sealing surface may be coated with a polymeric coating. In the case of a polymeric coating, however, it may be preferable to remove ribs 172 that are not on the edges of the seal. In addition, the tertiary seat seal 128 may be integral to the seat ring 32.

Figure 13:
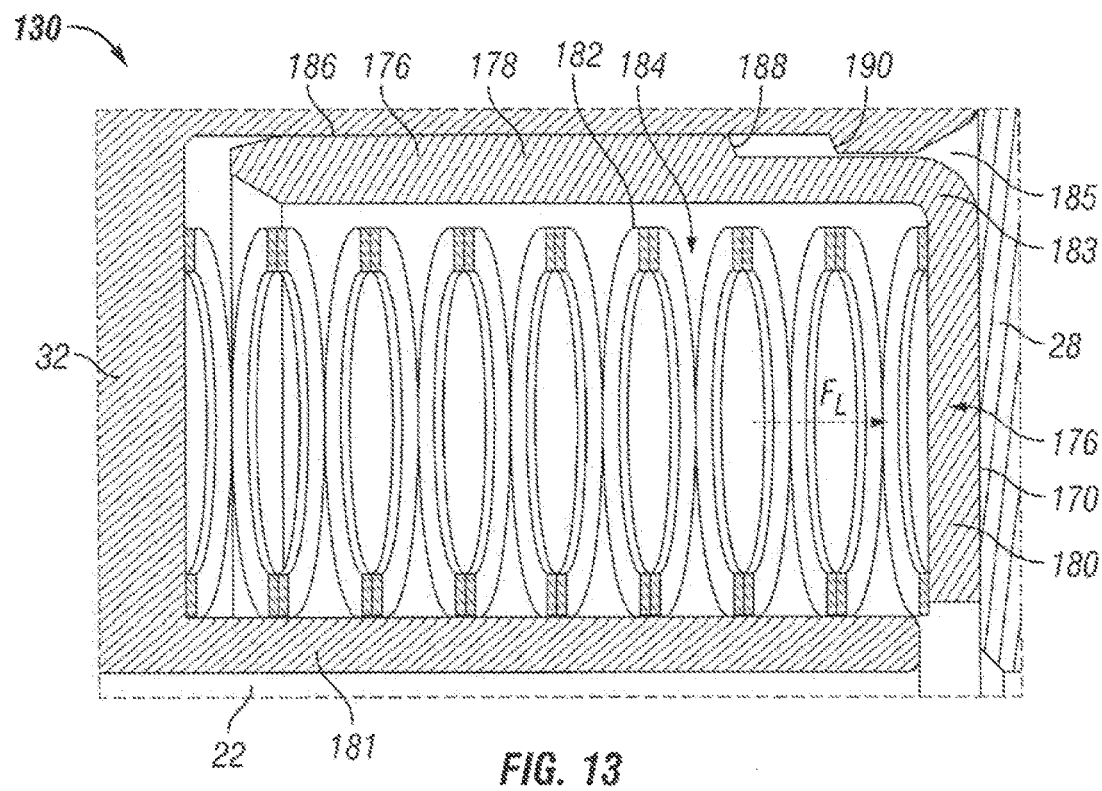
FIG. 13 is an enlarged side cross-sectional view of the sand excluder corresponding to area 13 in FIG. 9.

Referring to FIG. 13, there is shown the sand excluder 130. The sand excluder 130 is positioned proximate to the flow passageway 22, at the interface between the seat ring 32 and the valve body 28. One purpose of the sand excluder 130 is to prevent sand, or other solid particles, from entering between the seat ring 32 and the valve body 28. Such an ingress of solid particles could damage the seat seals 126, 128, 130, or cause other problems.

Figure 14:
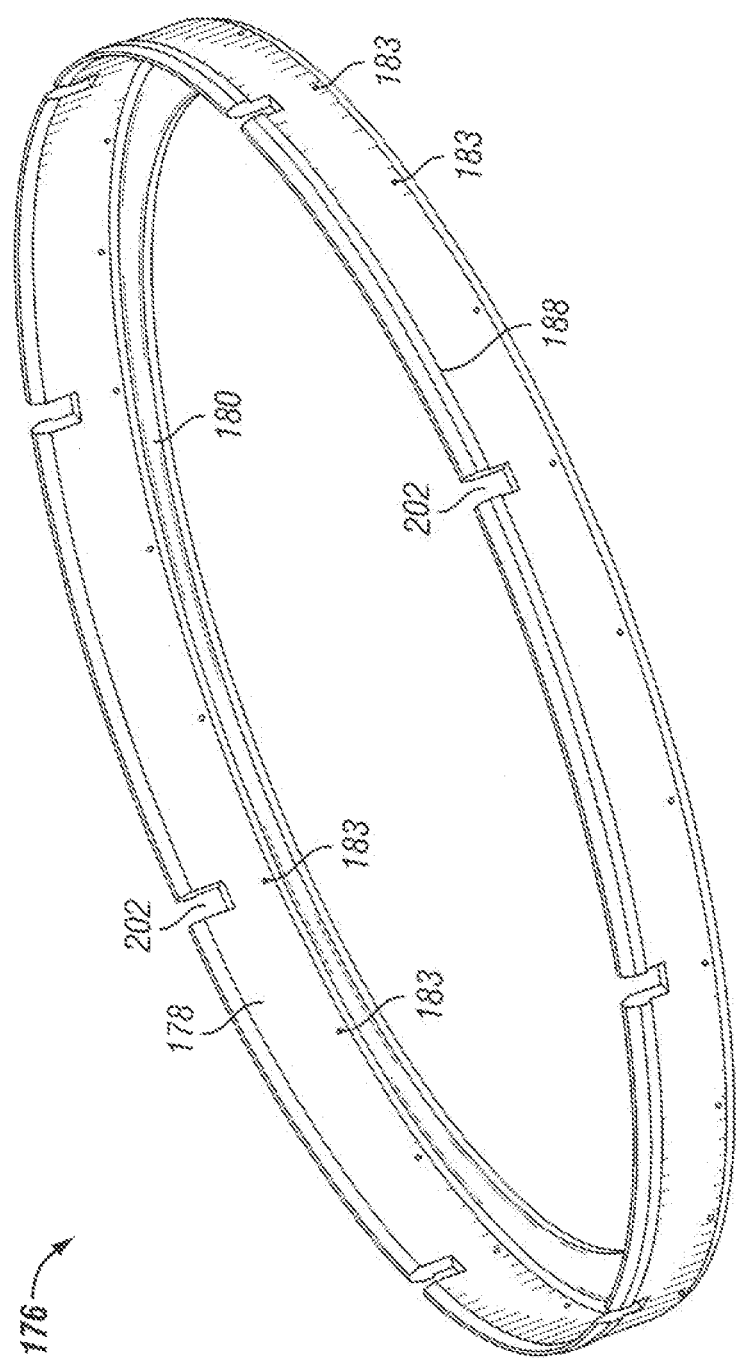
FIG. 14 is an enlarged perspective view of the excluding arm of the sand excluder of FIG. 13.

The sand excluder 130 includes an excluding arm 176 with an L-shaped cross-section, and having a transverse section 178 and a valve body engaging section 180, as well as a spring 182. The sand excluder 130 may be housed in an annular recess 184 within the seat ring 32 that is separated from the flow passageway 22 by an inner portion 181 of the seat ring 32. As best shown in FIG. 14, the transverse section 178 of the excluding arm 176 is cylindrical, and the valve body engaging section 180 is flat, and extends substantially perpendicularly from the transverse section 178. In some embodiments, slots 202 may be provided around the circumference of the transverse section 178. One purpose of the slots 202 is to allow the inner edge 204 of the transverse section 178 to flex inward toward the axis of the excluding arm 176 upon insertion of the excluding arm 176 into the recess 184 in the seat ring 32. Such inward flexion helps to slide the transverse section 178 of the excluding arm 176 past the hook 190 on the seat ring 32 (as discussed in detail below).

The transverse section 178 of the excluding arm 176 is positioned substantially adjacent and parallel to a transverse surface 186 of the seat ring 32, and the valve body engaging section 180 is positioned in a plane substantially parallel to the end face 170 of the counterbore 21 in the valve body 28. The spring 182 may be a compression spring that extends within the annular recess 184 between the seat ring 32 and the valve body engaging section 180 of the excluding arm 176. One purpose of the spring 182 is to push the valve body engaging section 180 of the excluding arm 176 against the surface of the valve body 28. To this end, the spring is partially compressed within the annular recess 184, and maintains a constant lateral force $F_L$ on the excluding arm 176 so that as the seat ring 32 moves toward or away from the valve body 28, as discussed above, the valve body engaging section 180 of the excluding arm 176 maintains constant contact with the valve body 28.

An aperture 183 may be provided in the excluding arm 176 between the annular recess 184 and an area 185 between the excluding arm 176 and the tertiary seat seal 128. The purpose of the aperture 183 is to create a path that allows the passage of fluid from the fluid passageway 22, into the annular recess 184, and on through the aperture 183 to the interface between the tertiary seat seal 128 and the valve body 28. Such a fluid passage prevents the excluding arm 176 from sealing against the valve body 28, which is undesirable because when the seat ring 32 is positioned upstream of a closed gate 16, the flow of fluid around the seat ring and past the valves may be necessary. Thus, the excluding arm 176 does not seal against the valve body 28.

The excluding arm 176 of the sand excluder 130 also includes means for limiting the lateral movement of the excluding arm 176 relative to the seat ring 32. For example, in the embodiment shown in FIG. 13, the transverse section 178 of the excluding arm 176 may include a catch 188 positioned to correspond to a hook 190 on the seat ring 32. As the excluding arm 176 moves laterally outward toward the valve body 28, the catch 188 will be intercepted by the hook 190, which will restrain further lateral outward movement. This feature may be beneficial, for example, to maintain the excluding arm 176 and spring 182 of the sand excluder 32 during assembly and installation of the seat valve 32 in the valve body 28.

Throughout the above description, numerous coatings have been discussed. For example, the primary stem seal coating 60, the tertiary stem seal coating 102, the hard coatings 120, 122 on the seat ring face and the gate, the primary seat seal coating 140, and the tertiary seat seal coating 174, have all been disclosed. A more detailed disclosure of the coatings that may be used on conjunction with components of the gate valve assembly 17 of the present technology can be found in U.S. Pat. Nos. 7,325,783, 7,255,328, and 8,146,889, as well as in pending U.S. patent application Ser. Nos. 13/341517 and 13/188940, each of which is incorporated herein by reference in its entirety.

While the technology has been shown or described in only some of its forms, it should be apparent to those skilled in the art that it is not so limited, but is susceptible to various changes without departing from the scope of the invention. Furthermore, it is to be understood that the above disclosed embodiments are merely illustrative of the principles and applications of the present invention. Accordingly, numerous modifications may be made to the illustrative embodiments and other arrangements may be devised without departing from the spirit and scope of the present invention as defined by the appended claims.

What is claimed is:

1. A gate valve, comprising:
   a valve body having a flow passageway and a central cavity, the flow passageway extending through the valve body, and the central cavity intersecting the flow passageway and extending substantially perpendicularly away from the flow passageway, the valve body having an annular counterbore at the intersection between the central cavity and the flow passageway on each side of the central cavity;
   a gate having an opening, and located at the intersection between the central cavity and the flow passageway, the gate having an open position, in which the opening is aligned with the flow passageway, and a closed position, in which the opening is not aligned with the flow passageway and the gate blocks the flow passageway;
   seat rings positioned on each side of the gate so that a seat ring is positioned in each of the annular counterbores, and circumscribing the flow passageway, the seat rings configured to guide the gate as it moves between an open and a closed position; and
   a seat seal assembly between the valve body and each seat ring, the seat seal assembly comprising:
     a thermoplastic seat seal positioned between the seat ring and the valve body, and configured to seal against surfaces of the seat ring and the valve body; and
     a sand excluder comprising a biased mechanism in retained engagement with the seat ring, for substantially constant contact with the valve body to reduce passage of solids between the valve body and the seat ring, the sand excluder defining an annular wall and an aperture disposed on the annular wall and between the valve body and the seal ring that permits the passage of fluid while preventing the passage of solid particles, the sand excluder positioned between the seat ring and the valve body, and between the flow passageway and the thermoplastic seat seal.

2. The gate valve of claim 1, wherein the seat seal assembly further comprises:
   an anti-extrusion ring positioned adjacent an end of the thermoplastic seat seal distal from the gate, the anti-extrusion ring configured to engage and support a surface of the thermoplastic seat seal to maintain the shape of the thermoplastic seat seal, thereby preventing reforming of the thermoplastic seat seal, the anti-extrusion ring having a protrusion extending from a surface thereof toward at least one of the seat ring and the valve body to maintain a gap between the anti-extrusion ring and the at least one of and the seat ring and the valve body.

3. The gate valve of claim 1, wherein the seat seal assembly further comprises:
   a face metal seat seal positioned farther from the gate than the thermoplastic seat seal, and having a sealing face configured for sealing engagement with a flat surface of the valve body, the sealing face of the face metal seat seal having at least one circular rib for engaging a flat surface of the valve body in the annular counterbore, and wherein the seat ring is sized so that it can move axially relative to a seat ring axis in the counterbore, and the circular rib seals only when pressed against the flat surface of the valve body.

4. The gate valve of claim 1, wherein the thermoplastic seat seal is attached to or integral with the seat ring and configured to seal against one of the surfaces of the valve body to prevent fluid from passing between the seat ring and the valve body in at least one direction, the thermoplastic seat seal having a first dynamic leg that can flex to allow fluid to pass the thermoplastic seat seal from behind the thermoplastic seat seal toward the gate.

5. The gate valve of claim 4, wherein the first leg of the thermoplastic seat seal is conical, a surface of the annular counterbore is conical, and the first leg sealingly engages the conical surface of the annular counterbore.

6. The gate valve of claim 1, wherein the sand excluder has a spring and an excluding arm, the excluding arm having a flat portion to engage a flat surface of the valve body in the counterbore, and the spring extending between the seat ring and the flat portion of the excluding arm, and biased to urge the flat portion of the excluding arm into substantially continuous contact with the valve body, the excluding arm having an aperture positioned to allow fluid to bypass the excluding arm and enter between the seat ring and the valve body.

7. The gate valve of claim 6, wherein the excluding arm of the sand excluder has a transverse section that is connected to the flat portion, and that includes a sand excluder notch, and wherein the seat ring includes a corresponding seat ring notch, the sand excluder notch configured so that when it contacts the seat ring notch the excluding arm is restrained from further movement outward toward the valve body.

8. A gate valve, comprising:
a valve body having a flow passageway and a central cavity, the flow passageway extending through the valve body, and the central cavity intersecting the flow passageway and extending substantially perpendicularly away from the flow passageway, the valve body having an annular counterbore at the intersection between the central cavity and the flow passageway on each side of the central cavity, each annular counterbore having an end face in a plane perpendicular to the flow passageway;
a gate having an opening, and located at the intersection between the central cavity and the flow passageway, the gate having an open position, in which the opening is aligned with the flow passageway, and a closed position, in which the opening is not aligned with the flow passageway and the gate blocks the flow passageway;
seat rings positioned on each side of the gate so that a seat ring is positioned in each of the annular counterbores, and circumscribing the flow passageway, each seat ring sized so that it can move axially relative to a seat ring axis in the annular counterbore, and configured to guide the gate as it moves between an open and a closed position, each seat ring having a first end being in a plane parallel to the end face of an annular counterbore; and
a seat seal assembly between the valve body and each seat ring, the seat seal assembly comprising:
a face metal seat seal integrally formed with the seat ring, and having a sealing face configured for sealing engagement with an end face of an annular counterbore, the sealing face of the face metal seat seal having at least one circular rib for engaging the end face of an annular counterbore, the at least one circular rib configured to seal only when pressed against the end face of the annular counterbore; and
a sand excluder comprising a biased mechanism in retained engagement with the seat ring, for substantially constant contact with the valve body to reduce passage of solids between the valve body and the seat ring, the sand excluder defining an annular wall and an aperture disposed on the annular wall and between the valve body and the seal ring that permits the passage of fluid while preventing the passage of solid particles, the sand excluder positioned between the seat ring and the valve body, and between the flow passageway and the face metal seat seal.

9. The gate valve of claim 8, wherein the thermoplastic seat seal is attached to or integral with the seat ring and configured to seal against a surface of the valve body to prevent fluid from passing between the seat ring and the valve body in at least one direction, the thermoplastic seat seal positioned between the outer diameter of the seat ring and the surface of the counterbore in the valve body.

10. The gate valve of claim 8, wherein the sand excluder has a spring and an excluding arm, the excluding arm having a flat portion to engage the end face of the annular counterbore, and the spring extending between the seat ring and the flat portion of the excluding arm, and biased to urge the flat portion of the excluding arm into substantially continuous contact with the valve body, the excluding arm having an aperture positioned to allow fluid to bypass the excluding arm and enter between the seat ring and the valve body.

11. The gate valve of claim 8, wherein the excluding arm of the sand excluder has a transverse section that is connected to the flat portion, and that includes a sand excluder notch, and wherein the seat ring includes a corresponding seat ring notch, the sand excluder notch configured so that when it contacts the seat ring notch the excluding arm is restrained from further movement outward toward the valve body.

12. The gate valve of claim 8, wherein the seat seal assembly further comprises:
a thermoplastic seat seal positioned between the seat ring and the valve body, configured to seal against surfaces of the seat ring and the valve body, and positioned between the gate and the face metal seat seal.

13. The gate valve of claim 12, wherein the seat seal assembly further comprises:
an anti-extrusion ring positioned adjacent an end of the thermoplastic seat seal distal from the gate, the anti-extrusion ring configured to engage and support a surface of the thermoplastic seat seal to maintain the shape of the thermoplastic seat seal, thereby preventing reforming of the thermoplastic seat seal, the anti-extrusion ring having a protrusion extending from a surface thereof toward at least one of the seat ring and the valve body to maintain a gap between the anti-extrusion ring and the at least one of and the seat ring and the valve body.

* * * * *